United States Patent Office 3,007,825
Patented Nov. 7, 1961

3,007,825
EMULSION
Richard H. Cubberley, Morristown, and William Thomas, South River, N.J., assignors to The Patent and Licensing Corporation, New York, N.Y., a corporation of Massachusetts
No Drawing. Filed Oct. 12, 1956, Ser. No. 615,511
7 Claims. (Cl. 154—50)

The present invention relates to an improved emulsion particularly adapted for making paper and paperboard impermeable to water vapor.

Boxboard, for many years, has been made with a bituminous layer interposed between the intermediate plies of the sheet. This has provided a material which is resistant to the passage of water vapor and wherein the vapor-proofing medium is inexpensively applied and substantially protected from removal or cracking when the board is folded, as might be the case with surface coated board.

In the commercial application of this process, an aqueous dispersion of bituminous waterproofing material in the form of a film or layer is applied to the surface of a wet ply on a paper making machine which is combined with other wet plies to form a multiple ply sheet with the bitumen in the inside. The bituminous material is of such a nature that the coating between the plies does not initially prohibit the water from draining off the paper, and yet after passing through dryer rolls a continuous film is formed which is resistant to the passage of water vapor.

Process and apparatus for coating the wet plies in this manner are described, for example, in U.S. Patents Nos. 1,686,818; 1,722,432; 1,724,137; 1,732,361, and more recent improvements are found in U.S. Patents Nos. 2,622,313 and 2,622,491. While this process and the product thereof has been found highly successful for many years, nevertheless, in certain applications it is desirable to have a material possessing greater water vapor resistance. Such a product should retain all of the other desirable features of the bitumen coating process, including the fact that the coating does not come in contact with the contents of a container which may be made from the board and also does not interfere with printing, folding or gluing the board.

It is a principal object of the present invention to provide an improved emulsion particularly adapted for water vapor-proofing board by the application to the wet plies thereof.

It is a further object of the present invention to provide an emulsion yielding a film having a greater water vapor transmission resistance than presently used bituminous emulsion.

It is a further object of the present invention to provide an improved moisture vapor-proofing emulsion applicable to wet plies of paper which initially does not prevent drainage and drying of the wet sheet during its manufacture.

It is a further object of the present invention to provide an improved moisture vapor-proofing emulsion applicable to wet plies of paper which initially does not prevent drainage of the wet sheet and which subsequently forms a water vapor-proof film which does not bleed substantially into the paper, even when heated during the usual drying operation on the paperboard machine.

These and other objects are attained by the present invention which relates to an improved emulsion comprising a mixture of emulsions or suspensions one comprising wax and polyisobutene or polyethylene and the other comprising an emulsion of asphalt. The asphalt emulsion is preferably the one commonly used for vapor-proofing board and preferably utilizes an asphalt with a 160–170° F. softening point and a 10–20 penetration at 77° F. utilizing kaolin clay as the emulsifying agent containing about 20 percent of clay based upon the asphalt and having a total solids content of about 60–65 percent. The other emulsion preferably comprises a major proportion of wax, a minor proportion of solid polyisobutene or polyethylene and utilizing clay as an emulsifying agent, together with a cationic promoter.

In order to obtain the desirable ratio of polyisobutene or polyethylene and wax to clay, it has been found necessary to utilize a cationic promoter. For example, a ratio of 2½ parts of polyisobutene and wax to 1 part of kaolin clay will form an unstable emulsion without a promoter. However, in order to obtain ratios of 3 to 10 parts of polyisobutene wax per part of kaolin clay in a stable emulsion, it is necessary to use a promoter. It has been found that a cationic promoter such as an alkyl amine is effective. Petroleum waxes may be used, including paraffin wax, but microcrystalline wax of low oil content is preferable, since it gives a film which does not crack or craze easily. The clay is selected from the group consisting of ball clay and kaolin clay, but kaolin clay has been found preferable. The clay stabilized emulsion on drying forms a film which will not flow under heat because of the honeycomb structure of the film. Clays such as bentonite are not desirable because of the difficulty of drainage due to highly colloidal gels which are formed and which may permit the sheet to separate.

The polyisobutene should be a substantially solid material which is somewhat elastomeric in nature, having a molecular weight in the range 30,000 to 150,000. The polyethylene should be a substantially solid resinous material, or in other words, having a molecular weight in the range 7,000 to 25,000. The invention is primarily concerned with either of these two materials or with mixtures thereof, or with mixtures of either one and small amounts of other resins. Preferably however, substantially pure polyisobutene is used. The most preferable material is GRI or butyl rubber, which is substantially pure polyisobutene copolymerized with approximately 2.5 percent of polyisoprene. Another suitable commercial product is known as "Vistanex," which is similar to the butyl rubber but does not contain polyisoprene.

The amount of polymer should be in the range 5 to 45 percent of the total polymer wax composition and is preferably about 25 percent. Mixtures of the two polymers found particularly suitable include 5 parts polyethylene, 20 parts polyisobutene and 75 parts wax. In any case, a desirable composition of polymer and wax should have a viscosity of about 100,000 centipoises at 180 to 220° F.

The cationic promoter may be any cationic surface active agent. Of these, it has been found preferable to use an amine known commercially as "Armeen H.T.D.," which is approximately 25 percent hexadecyl amine, 70 percent octadecyl amine and 5 percent octadecenyl amine. The cationic surface active agents are illustrated by the following:

A. Aliphatic amines and their derivatives.
   Dodecylamine
B. Homologs of aromatic amines having fatty chains.
   Dodecylaniline
C. Fatty amides derived from aliphatic diamines.
   Undecylimidazoline
D. Fatty amides derived from disubstituted diamines.
   Oleylaminodiethylamine
E. Quaternary ammonium salts and hydrates.
   Triethyl cetyl ammonium iodide F. Amides obtained from amino alcohols and their quaternary ammonium derivatives.
   Dimethylstearyl hydroxyethyl ammonium
F. Quaternary ammonium bases derived from the fatty amides of disubstituted diamines.
H. Fatty amides derived from benzimidazolines.

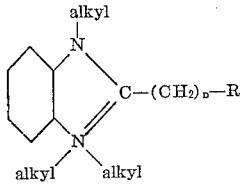

I. Basic pyrodinium compounds and their salts.
   Octadecyl methylene pyridinium acetate
J. Basic sulfonium, phosphonium and antimonium compounds.
   Methyl sulfate of dimethyloctadecyl sulfonium
K. Betaine compounds of quaternary ammonium.
   Hydrochloride of dimethyloctadecylmethyl aminoacetate
L. Dimethylphenylbenzyl ammonium chloride.
M. Urethanes or basic salts of ethylene diamine.
   Menthol diurethane hydrochloride
N. Polyethylene diamines and their quaternary ammonium derivatives.
O. Polypropanol polyethanolamines.

EXAMPLE A

All equipment should be clean to prevent discoloration of the emulsion. The water used should be substantially free of sulfur compounds.

Preparation of master batch: Parts
    Polyisobutene (GRI-17) _____ 96.5
    Microcrystalline wax (oil content 0.4%) (M.P., 180° F., 30 pen. @ 77° F.) _____ 53.5

The polyisobutene was placed in a slightly warm Banbury mixer. The batch was mixed until the temperature rose to 250–300° F. and then about ¼ of the total wax was added. This was repeated 3 times, the wax being added only when the temperature was between 250 and 300° F.

Preparation of emulsion: Parts
    Master batch _____ 150
    Microcrystalline wax _____ 236
    Alkyl amine (Armeen H.T.D.) _____ 0.2
    Clay slip at 210° F.—
        77.1 parts of kaolin clay (Crossman clay)
        154.2 parts water
    Lignin sulphonate:
        0.25 part of lignin sulphonate (Marasperse N) was dissolved in 1 part of water heated between 140 and 150° F.
    Water _____ 223

The master batch was mixed with about 45 parts wax in a Baker-Perkins dispersion mixer heated to about 100 to 120° F. When a homogeneous blend was produced, 45 parts more of wax were added. As soon as the blend again became homogeneous the remainder of the wax was added. After waiting several minutes and then raising the temperature of the blend to 195–200° F. the alkyl amine was added. At this point the mixer was stopped and the entire clay slip quickly added. The mixer was immediately started and the temperature maintained at 180° F. after which the blend inverted. After a few minutes the mixture assumed a homogeneous appearance and part of the water at 210° F. was added gradually for several minutes. Thereafter, the rest of the water at room temperature was added and the lignin sulphonate solution added. The emulsion was passed through a 30-mesh screen and stored in polyethylene lined drums.

The polymer emulsion of Example A was physically mixed with an asphalt-clay emulsion usually used in vapor-proofing board. The invention is not limited to the physical mixing of the two emulsions since it is possible to produce the two emulsions simultaneously.

In the following table a copolymer emulsion as listed in Example A was mixed with an asphalt-clay emulsion in the proportions indicated in the percentage of solids analyses given in the table. In the table, W.V.T.R. relates to water vapor transmission rate in grams per 100 square inches per 24 hours at 100° F. and 95 percent relative humidity. The theoretical W.V.T.R. means the W.V.T.R. actually found for the asphalt emulsion alone and for the copolymer emulsion alone computed to the proportions indicated in each example.

Table

| | Examples | | | |
|---|---|---|---|---|
| | 1 | 2 | 3 | 4 |
| Percentage Solids: | | | | |
| Copolymer | 1.05 | 2.10 | 3.15 | 4.20 |
| Wax | 3.15 | 6.30 | 9.45 | 12.60 |
| Asphalt | 79.20 | 75.00 | 70.80 | 66.60 |
| Clay | 16.60 | 16.60 | 16.60 | 16.60 |
| Theoretical W.V.T.R. | 7.6 | 7.2 | 6.8 | 6.4 |
| Actual W.V.T.R. | 2.7 | 1.8 | 1.4 | 1.3 |
| Percent Improvement | 180 | 400 | 490 | 495 |

The combined emulsions of these examples were diluted with equal parts of water and delivered to an application apparatus on a paper machine of the type adapted to apply bituminous emulsion to wet plies. The usual device for application is a wire covered cylinder immersed in a bath of the emulsion maintained at a constant level. The finished board made on the machine was tested after passing through the drying rolls and stacked in the usual manner. Examination of the sheet showed that the film had not migrated, and the plies adhered satisfactorily.

Water vapor permeability tests were made by covering weighed dishes of anhydrous calcium chloride with samples of board, placing the dishes in a constant humidity apparatus such as the General Foods cabinet, and then weighing the dishes again at stated time intervals. The tests are TAPPI tests T-464-m-45. The average water vapor transmission of the straight wax-polyisobutene sheet was very low, averaging about 0.4 gram of water per 100 square inches of board per 24 hours at 100° F. with 90 percent relative humidity for 10 lbs. blend per 1000 square feet of board. This compares with a moisture vapor transmission of 2.5 grams for a coverage of about 20 lbs. per 1000 square feet of bitumen.

The ratio of the copolymer-wax emulsion to the asphalt emulsion may be varied but based on a percentage of solids it has been found that substantially less than 5 percent of copolymer-wax based on the combined copolymer-wax and asphalt does not give sufficiently great improvement, whereas more than 20 percent becomes uneconomical. About 10 percent is preferable since it gives very substantial unexpected results with an economically feasible amount of the more expensive material.

We claim:
1. An oil-in-water emulsion suitable for water vapor-proofing paper comprising a mixture of an asphalt-clay emulsion and an emulsion comprising water, petroleum wax, a solid polymer selected from the group consisting of homopolymers of isobutene, copolymers of isobutene with approximately 2.5% isoprene, polyethylene and mixtures thereof, the weight of said wax exceeding the weight of said polymer, a clay selected from the group consisting of kaolin and ball clay as an emulsifying agent, and a cationic surface active agent as a promoter for said clay, wherein the ratio of combined wax and polymer is 3 to 10 parts per part of clay.

2. An oil-in-water emulsion suitable for water vaporproofing paper comprising a mixture of an asphalt-clay emulsion and an emulsion comprising water, petroleum wax, a solid polymer selected from the group consisting of homopolymers of isobutene, copolymers of isobutene with approximately 2.5% isoprene, polyethylene and mixtures thereof, the weight of said wax exceeding the weight of said polymer, a clay selected from the group consisting of kaloin and ball clay as an emulsifying agent, and a cationic surface active agent as a promoter for said clay, wherein the ratio of combined wax and polymer is 3 to 10 parts per part of clay and wherein the amount of polymer is in the range 5% to 30% of the combined polymer and wax.

3. An oil-in-water emulsion suitable for water vaporproofing paper comprising a mixture of an asphalt-clay emulsion and an emulsion comprising water, microcrystalline wax, butyl rubber, kaolin clay as an emulsifying agent and an alkyl amine surface active agent promoter for said clay wherein the amount of butyl rubber is in the range 5% to 30% by weight of the combined wax and rubber, wherein the proportion of rubber and wax to clay is in the ratio of 3 to 10 parts of rubber and wax per part of clay, and wherein there are about 0.2 part by weight of alkyl amine to each 77 parts of clay.

4. An oil-in-water emulsion suitable for water vaporproofing paper comprising a mixture of an asphalt-clay emulsion and an emulsion comprising water, petroleum wax, a solid polymer selected from the group consisting of homopolymers of isobutene, copolymers of isobutene with approximately 2.5% isoprene, polyethylene and mixtures thereof, the weight of said wax exceeding the weight of said polymer, a clay selected from the group consisting of kaolin and ball clay as an emulsifying agent, and a cationic surface active agent as a promoter for said clay, wherein the ratio of combined wax and polymer is 3 to 10 parts per part of clay and wherein the combined wax and polymer comprises from 5% to 20% on a dry weight basis of the combined wax, polymer and asphalt.

5. An oil-in-water emulsion suitable for water vaporproofing paper comprising a mixture of an asphalt-clay emulsion and an emulsion comprising water, petroleum wax a, solid polymer selected from the group consisting of homopolymers of isobutene, copolymers of isobutene with approximately 2.5% isoprene, polyethylene and mixtures thereof, the weight of said wax exceeding the weight of said polymer, a clay selected from the group consisting of kaolin and ball clay as an emulsifying agent, and a cationic surface active agent as a promoter for said clay, wherein the ratio of combined wax and polymer is 3 to 10 parts per part of clay and wherein the amount of polymer is in the range 5% to 30% of the combined polymer and wax and wherein the combined wax and polymer is about 10% on a dry solids weight basis of the combined wax, polymer and asphalt.

6. A water vapor-proof paper board comprising a multiply board at least one of the inner plies of which is coated with a composition comprising a mixture of an asphalt-clay emulsion and an emulsion comprising water, petroleum wax, a solid polymer selected from the group consisting of homopolymers of isobutene, copolymers of isobutene with approximately 2.5% isoprene, polyethylene and mixtures thereof, the weight of said wax exceeding the weight of said polymer, a clay selected from the group consisting of kaolin and ball clay as an emulsifying agent, and a cationic surface active agent as a promoter for said clay, wherein the ratio of combined wax and polymer is 3 to 10 parts per part of clay.

7. A water vapor-proof paper board comprising a multiply board at least one of the inner plies of which is coated with a composition comprising a mixture of an asphalt-clay emulsion and an emulsion comprising water, petroleum wax, a solid polymer selected from the group consisting of homopolymers of isobutene, copolymers of isobutene with approximately 2.5% isoprene, polyethylene and mixtures thereof, the weight of said wax exceeding the weight of said polymer, a clay selected from the group consisting of kaolin and ball clay as an emulsifying agent, and a cationic surface active agent as a promoter for said clay, wherein the ratio of combined wax and polymer is 3 to 10 parts per part of clay and wherein the combined wax and polymer comprises from 5% to 20% on a dry weight basis of the combined wax, polymer and asphalt.

References Cited in the file of this patent

UNITED STATES PATENTS

| | | |
|---|---|---|
| 2,394,616 | Knoth et al. | Feb. 12, 1946 |
| 2,506,339 | Buckley et al. | May 2, 1950 |
| 2,859,190 | Cubberley et al. | Nov. 4, 1958 |